(12) United States Patent
Jung et al.

(10) Patent No.: US 7,705,800 B2
(45) Date of Patent: *Apr. 27, 2010

| | | | |
|---|---|---|---|
| (54) | MULTI-ANGLE MIRROR | | |
| (75) | Inventors: | Edward K. Y. Jung, Bellevue, WA (US); Royce A. Levien, Lexington, MA (US); Mark A. Malamud, Seattle, WA (US); John D. Rinaldo, Jr., Seattle, WA (US) | |
| (73) | Assignee: | Searete LLC, Bellevue, WA (US) | |
| ( * ) | Notice: | Subject to any disclaimer, the term of this patent is extended or adjusted under 35 U.S.C. 154(b) by 0 days. | |
| | | This patent is subject to a terminal disclaimer. | |
| (21) | Appl. No.: | 11/982,396 | |
| (22) | Filed: | Oct. 31, 2007 | |
| (65) | | Prior Publication Data | |
| | US 2008/0129689 A1 | Jun. 5, 2008 | |
| | | Related U.S. Application Data | |
| (63) | Continuation-in-part of application No. 10/941,803, filed on Sep. 15, 2004. | | |
| (51) | Int. Cl. G09G 3/00 (2006.01) | | |
| (52) | U.S. Cl. .................. 345/32; 345/156 | | |
| (58) | Field of Classification Search ........... 345/8, 345/32, 156; 132/301; 434/371; D28/64.1 See application file for complete search history. | | |
| (56) | | References Cited | |

U.S. PATENT DOCUMENTS

| | | | |
|---|---|---|---|
| 3,838,525 A | 10/1974 | Harvey | |
| 3,934,226 A | 1/1976 | Stone et al. | |
| 4,309,094 A * | 1/1982 | Bollen .................. 396/5 |
| 5,198,936 A | 3/1993 | Stringfellow | |
| 5,997,149 A | 12/1999 | Chu | |
| 6,032,119 A | 2/2000 | Brown et al. | |
| 6,071,236 A | 6/2000 | Iliff | |
| 6,077,225 A | 6/2000 | Brock-Fisher | |
| 6,095,985 A | 8/2000 | Raymond et al. | |
| 6,120,467 A | 9/2000 | Schallhorn | |
| 6,238,337 B1 | 5/2001 | Kambhatla et al. | |
| 6,272,468 B1 | 8/2001 | Melrose | |
| 6,322,502 B1 | 11/2001 | Schoenberg et al. | |
| 6,336,900 B1 | 1/2002 | Alleckson et al. | |
| 6,402,689 B1 | 6/2002 | Scarantino et al. | |
| 6,440,090 B1 | 8/2002 | Schallhorn | |
| 6,454,708 B1 | 9/2002 | Ferguson et al. | |
| 6,468,263 B1 | 10/2002 | Fischell et al. | |
| 6,477,394 B2 | 11/2002 | Rice et al. | |
| 6,516,210 B1 | 2/2003 | Foxall | |
| 6,542,204 B1 | 4/2003 | Ohzawa et al. | |
| 6,556,977 B1 | 4/2003 | Lapointe et al. | |
| 6,569,094 B2 | 5/2003 | Suzuki et al. | |
| 6,574,742 B1 | 6/2003 | Jamroga et al. | |
| 6,678,703 B2 | 1/2004 | Rothschild et al. | |
| 6,710,927 B2 | 3/2004 | Richards | |

(Continued)

FOREIGN PATENT DOCUMENTS

| | | |
|---|---|---|
| JP | 05181216 A2 | 7/1993 |
| JP | 06055957 A2 | 3/1994 |
| WO | WO 02/080773 A1 | 10/2002 |

OTHER PUBLICATIONS

U.S. Appl. No. 11/639,366, Jung et al.
U.S. Appl. No. 11/638,305, Allen et al.
U.S. Appl. No. 11/540,928, Allen et al.
U.S. Appl. No. 11/478,334, Allen et al.
U.S. Appl. No. 10/972,319, Allen et al.
U.S. Appl. No. 10/951,002, Allen et al.
Azuma, Ronald; Baillot, Yohan; Behringer, Reinhold; Feiner, Steven; Julier, Simon; Macintyre, Blair; "Recent Advances in Augmented Reality," pp. 34-47; located at www.cs.unc.edu/~azuma/cga2001.pdf; bearing a date of Nov./Dec. 2001; printed on Jul. 12, 2004.

(Continued)

*Primary Examiner*—Ricardo L Osorio

(57) ABSTRACT

Multi-angle mirror methods and related systems.

25 Claims, 11 Drawing Sheets

U.S. PATENT DOCUMENTS

| | | | |
|---|---|---|---|
| 6,725,200 B1 | 4/2004 | Rost | |
| 6,746,122 B2 | 6/2004 | Knox | |
| 6,755,539 B2 | 6/2004 | Brennesholtz | |
| 6,757,087 B1 | 6/2004 | Taketomi et al. | |
| 6,760,515 B1 | 7/2004 | Wang et al. | |
| 6,761,458 B2 | 7/2004 | Sakata et al. | |
| 6,762,870 B2 | 7/2004 | De Vaan | |
| 6,768,915 B2 | 7/2004 | Brand et al. | |
| 6,774,869 B2 | 8/2004 | Biocca et al. | |
| 6,869,772 B2 | 3/2005 | Lichtman et al. | |
| 7,080,910 B2 * | 7/2006 | Engle | 353/119 |
| 7,133,003 B2 | 11/2006 | Allen et al. | |
| 7,259,731 B2 | 8/2007 | Allen et al. | |
| 7,259,732 B2 | 8/2007 | Allen et al. | |
| 7,283,106 B2 | 10/2007 | Allen et al. | |
| 2001/0031081 A1 | 10/2001 | Quan et al. | |
| 2001/0037191 A1 * | 11/2001 | Furuta et al. | 703/6 |
| 2002/0196333 A1 | 12/2002 | Gorischek | |
| 2003/0041871 A1 | 3/2003 | Endo et al. | |
| 2004/0095359 A1 | 5/2004 | Simon et al. | |
| 2005/0027567 A1 | 2/2005 | Taha | |
| 2005/0035313 A1 * | 2/2005 | Garssen et al. | 250/559.33 |
| 2005/0174473 A1 * | 8/2005 | Morgan et al. | 348/370 |
| 2005/0185278 A1 | 8/2005 | Horsten et al. | |
| 2006/0017605 A1 * | 1/2006 | Lovberg et al. | 342/22 |

OTHER PUBLICATIONS

Butz, Andreas; Beshers, Clifford; Feiner, Steven; "Of Vampire Mirrors and Privacy Lamps: Privacy Management in Multi-User Augmented Environments," pp. 171-172; located at http://www1.cs.columbia.edu/~butz/publications/papers/uist98.pdf; bearing a date of Nov. 2-4, 1998; printed on Jul. 12, 2004.

Computer Vision & Robotics Laboratory Beckman Institute, "Multiview Mirror Pyramid Panoramic Cameras," Tan, Kar-Han; Hua, Hong; Ahuja, Narendar from the Beckman Institute for Advanced Science and Technology, University of Illionois at Urbana-Champaign, pp. 1-4 located at http://vision.ai.uiuc.edu/~tankh/Camera/camera.html printed on Aug. 9, 2004.

Francois, Alexandre R.J.; Kang, Elaine; "The Virtual Mirror," pp. 1-5; located at http://iris.usc.edu/~afrancoi/virtual_mirror/; printed on Jul. 12, 2004.

Fulford, Benjamin, "Adventures in the Third Dimension" pp. 1-3 located at www.forbes.com/forbes/2004/0524/166_print.html bearing a date of May 24, 2004 and printed on Sep. 1, 2004.

Healthy Style Products, "Emjoi—The Mirror AP-13," pp. 1-2 located at http://www.healthystyleproducts.com/mirror.html printed on Sep. 1, 2004.

Highbeam Research; "Winntech. (Globalshop 2003 Spotlight);" pp. 1; located at http://www.highbeam.com/library/doc0.asp?docid=1G1:99048681&refid=ink_g5s1&skeyw; printed on Jul. 12, 2004.

Lin, I-Chen; Yeh, Jeng-Sheng; and Ouhyoung, Ming from National Taiwan University, "Extracting 3D Facial Animation Parameters from Multiview Video Clips," pp. 2-10, bearing a date of Nov./Dec. 2002 and printed on Sep. 1, 2004.

Lin, I-Chen, "The Software Tool of Mass 3D Facial Animation Parameter Extraction from Mirror-Reflected Multi-View Video User's Instruction Version 1.0," located at http://www.cmlab.csie.ntu.edu.tw/~ichen, pp. 1-24 (+ cover sheet), printed on Sep. 1, 2004.

Morimoto, Carlos Hitoshi; "Interactive Digital Mirror," from XIV Brazilian Symposium on Computer Graphics and Image Processing (SIBGRAPI'01), Oct. 15-18, 2001; pp. 1; located at http://csdl.computer.org/comp/proceeding/sibgrapi/2001/1330/00/13300232abs.htm; bearing a date of 2001; printed on Jul. 12, 2004.

NexTag, "Accessories—compare prices, review and buy at NexTag—Price—Review re Jerdon Mirror,"pp. 1-2 located at http://www.nextag.com/Jerdon_Accessories~2702144zJerdonz0zB36ozmainz5-htm printed on Aug. 9, 2004.

NP Review Info, "New Product Reviews: New New Product Review—Jerdon JGL9W 5X Magnification Tri-fold Lighted Mirror Product Review," pp. 1-3 located at http://www.npreview.info/Home-and-Garden/Home-Decor/Mirrors/Vanity-Mirrors/Jerdon-JGL9W-5X-Magnification-Tri-fold-Lighted-Mirror.html printed on Sep. 1, 2004.

PCT International Search Report; International App. No. PCT/US05/27410; Jan. 27, 2006.

PCT International Search Report; International App. No. PCT/US05/27250; May 2, 2006.

PCT International Search Report; International App. No. PCT/US05/27249; Apr. 21, 2006.

PCT International Search Report; International App. No. PCT/US05/27256; Apr. 21, 2006.

Radford, Tim, "Mirror, Mirror on the Wall, Who'll Be Fattest of Them All?", The Guardian Unlimited, bearing a date of Feb. 3, 2005, pp. 1-4, located at http://www.guardian.co.uk/uk_news/story/0,3604,1404636,00.html, printed on Feb. 4, 2005.

Riviere, Cameron; Taylor, Russ; Digioia, A.; Wenz, J.; Kostuik, J.; Frassica, F.; "Engineered System Family #3: Information-enhanced Minimally Invasive Surgery," pp. 1-12; located at http://cisstweb.cs.jhu.edu/research/InfoEnhMIS/InfoEnhMISMain.htm; printed on Jul. 12, 2004.

Rochester Institute of Technoloy; "Introduction to Augmented Reality," pp. 1-12; located at http://www.se.rit.edu/~jrv/research/ar/introduction.html; printed on Jul. 12, 2004.

SIGGRAPH Emerging Technologies 1991-2002; "Interactive Paradigm, Technique," pp. 1-5; located at http://www.siggraph.org/~fujii/etech/s_interactive.html; bearing a date of Jul. 5, 2002; printed on Jul. 12, 2004.

SIGGRAPH Emerging Technologies 1991-2002; "Magic Morphin Mirror: Face-Sensitive Distortion and Exaggeration," pp. 1-2; located at http://siggraph.org./~jujii/etech/1997_190.html; bearing a date of Jul. 5, 2002; printed on Jul. 12, 2004.

Spohrer, J.C.; "Information in places," from vol. 38, allegedly of No. 4, 1999, Pervasive Computing; pp. 1-25; located at http://www.research.ibm.com/journal/sj/384/spohrer.html; printed on Jul. 12, 2004.

Sturm, Peter, "Mixing Catadioptric and Perspective Cameras," pp. 1-8, located at http://www.inrialpes.fr/movi/people/Sturm bearing a date of 2002 and printed on Sep. 1, 2004.

Tan, Kar-Han; Hua, Hong, Ahuja, Narenda "Multiview Panoramic Cameras Using Mirror Pyramids," accepted for publication in the IEEE Transactions on Pattern Analysis and Machine Intelligence journal, pp. 1-19 (+ cover sheet), printed on Sep. 1, 2004.

Taniguchi, Rin-Ichiro, "Real-Time Multiview Image Analysis and Its Application," pp. 1-8 printed on Sep. 1, 2004.

The Swiss Technorama Science Center, "Mirrors in Mind: Mirror, Mirror, on the Wall," pp. 1-12, located at http://www.technorama.ch/rentals/description.html printed on Sep. 1, 2004.

Traxtal; "What is Augmented Reality," pp. 1-2; located at http://www.traxtal.com/rd/rd_classroom_augmentedreality.htm; printed on Jul. 12, 2004.

U.S. Appl. No. 12/220,671, Allen et al.
U.S. Appl. No. 12/154,694, Allen et al.
U.S. Appl. No. 11/982,731, Allen et al.
U.S. Appl. No. 11/982,326, Allen et al.
U.S. Appl. No. 11/981,805, Allen et al.
U.S. Appl. No. 11/726,114, Allen et al.
PCT International Search Report; International App. No. PCT/US05/27411; Jul. 7, 2008; pp. 1-2.

* cited by examiner

MULTI-ANGLE MIRROR

CROSS-REFERENCE TO RELATED APPLICATIONS

The present application is related to and claims the earliest available effective filing date(s) from the following listed application(s) (the "Related Applications") (e.g., claims earliest available priority dates for other than provisional patent applications; claims benefits under 35 USC § 119(e) for provisional patent applications), and incorporates by reference in its entirety all subject matter of the following listed application(s); to the extent such subject matter is not inconsistent herewith the present application also claims the earliest available effective filing date(s) from, and also incorporates by reference in its entirety all subject matter of any and all parent, grandparent, great-grandparent, etc. applications of the following listed application(s):

RELATED APPLICATIONS

1. For purposes of the USPTO extra-statutory requirements, the present application constitutes a continuation-in-part of United States patent application entitled TIME-LAPSING MIRROR, U.S. application Ser. No. 10/910,421 naming Paul G. Allen, Edward K.Y. Jung, Royce A. Levien, Mark A. Malamud, and John D. Rinaldo, Jr. as inventors, filed 02 Aug. 2004, which is currently co-pending, or is an application of which a currently co-pending application is entitled to the benefit of the filing date.
2. For purposes of the USPTO extra-statutory requirements, the present application constitutes a continuation-in-part of U.S. patent application Ser. No. 10/912,271 entitled COSMETIC ENHANCEMENT MIRROR, naming Paul G. Allen, Edward K.Y. Jung, Royce A. Levien, Mark A. Malamud, and John D. Rinaldo, Jr. as inventors, filed 05 Aug. 2004, which is currently co-pending, or is an application of which a currently co-pending application is entitled to the benefit of the filing date.
3. For purposes of the USPTO extra-statutory requirements, the present application constitutes a continuation-in-part of U.S. patent application Ser. No. 10/941,803, entitled Multi-Angle Mirror, naming Edward K.Y. Jung; Royce A. Levien; Mark A. Malamud; John D. Rinaldo, Jr. as inventors, filed 15 Sep. 2004, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Applications is incorporated herein by reference to the extent such subject matter is not inconsistent herewith.

TECHNICAL FIELD

The present application relates, in general, to mirror technologies.

SUMMARY

In one aspect, a system includes but is not limited to at least one mirror; a data presentation device proximate to said at least one mirror; and a multi-angle view/registration engine operably couplable to said data presentation device. In addition to the foregoing, other system aspects are described in the claims, drawings, and text forming a part of the present application.

In one aspect, a system includes but is not limited to a mirror; and an offset-view image representation capture device having an image field different from an image field corresponding to said mirror. In addition to the foregoing, other system aspects are described in the claims, drawings, and text forming a part of the present application.

In one aspect, a method includes but is not limited to accepting input related to an image of a light reflecting structure/surface; and presenting one or more view-shifted images related to at least a part of the image of the light reflecting structure/surface. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to a digital mirror; a data presentation device proximate to said digital mirror; and a multi-angle view engine operably couplable to said data presentation device. In addition to the foregoing, other system aspects are described in the claims, drawings, and text forming a part of the present application In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the detailed description set forth herein.

BRIEF DESCRIPTION OF THE FIGURES

The use of the same symbols in different drawings typically indicates similar or identical items.

DETAILED DESCRIPTION

Figure 1:
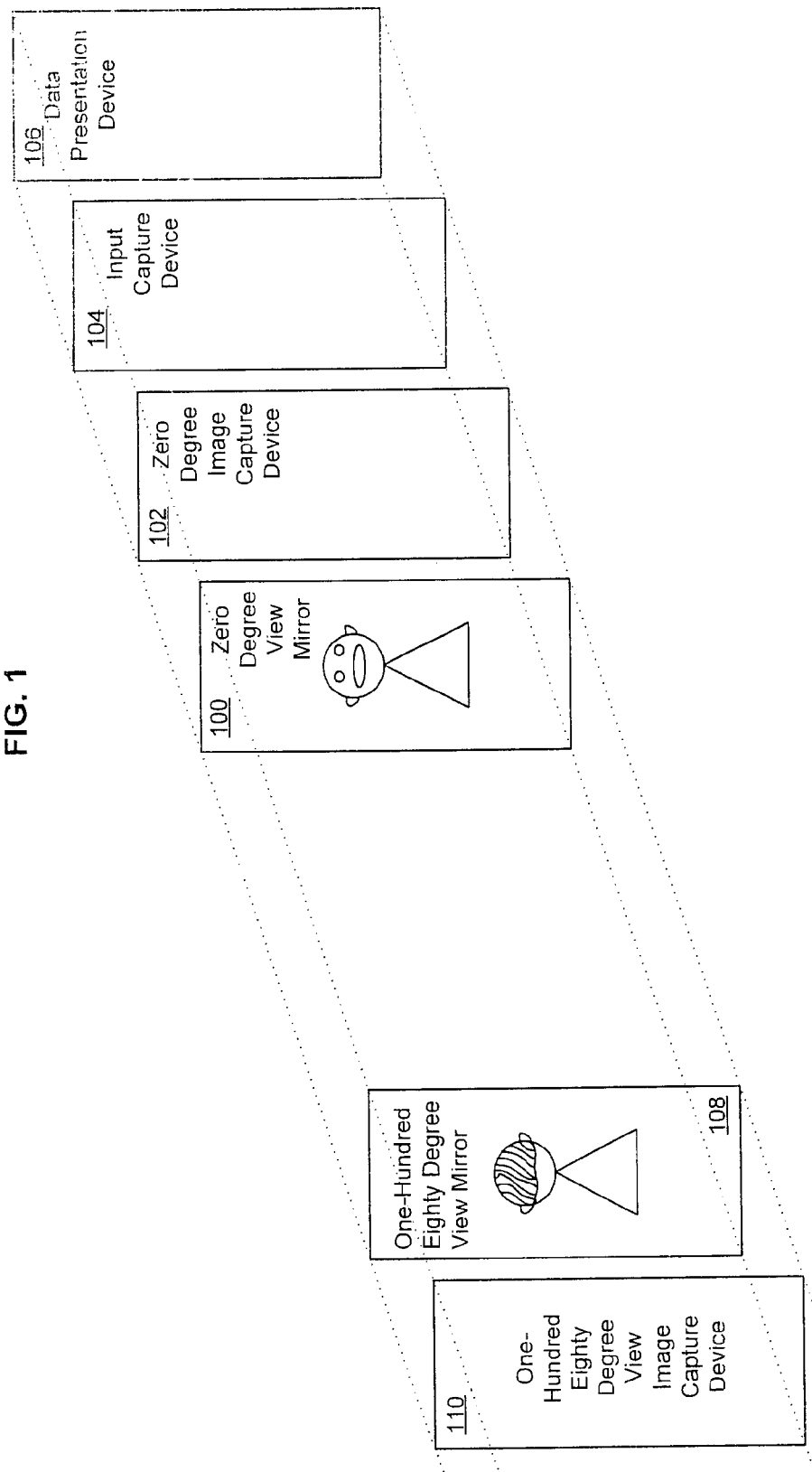
FIG. 1 shows a partial view of a system that may serve as an illustrative environment of and/or for subject matter technologies.

With reference to the figures, and with reference now, to FIG. 1, shown is a partial view of a system that may serve as an illustrative environment of and/or for subject matter technologies. Depicted are zero degree view mirror 100, zero degree image capture device 102, input capture device 104, data presentation device 106, one-hundred-eighty degree view mirror 108, and one-hundred eighty degree view image capture device 110. In one exemplary implementation, zero degree view mirror 100 and/or one-hundred-eighty degree view mirror 108 can be a plane mirror, a convex mirror, and/or a concave mirror (the same is generally true for substantially any mirroring device described herein, unless context dictates otherwise). In another exemplary implementation, one or more of the mirrors described herein can be partially silvered mirrors. In some exemplary implementations, one or more of the mirrors described herein can be physical mirrors. In other exemplary implementations, one or more of the mirrors described herein can be digital mirrors and/or projection mirrors. In yet other implementations, one or more of the mirrors described herein can be combinations of one or more physical mirrors and/or one or more digital mirrors and/or one or more projection mirrors. In some implementations, data presentation device 106 may present various types of multi-angle view information (e.g., either simultaneous and/or sequential images of a person as viewed from the front, side, back, etc.) in addition to or in the alternative of time-lapse information, image information, height and/or weight information. In some implementations, presentations of information may be in the form of various modalities including but not limited to graphs, tables, audio (speech, music, sound), text, store-and-forward formats (e.g., email, voicemail, and/or simple message system mail at various reporting intervals, such as in a weekly digest format), et cetera.

Continuing to refer to FIG. 1 illustrated is data presentation device 106 proximate to zero degree view mirror 100. One exemplary implementation of data presentation device 106 proximate to zero degree view mirror 100 includes but is not limited to data presentation device 106 integral with zero degree view mirror 100; other exemplar) implementations include but are not limited to like data presentation devices integral with virtually any one or more mirrors described herein (e.g., one or more mirrors respectively associated with one or more image capture devices 102, 110, 300, 304, 308, 312, 316, and/or 320 as described in relation to FIG. 3). Another exemplary implementation of data presentation device 106 proximate to zero degree views mirror 100 includes but is not limited to data presentation device 106 operably coupled with zero degree view mirror 100 (e.g., as used herein, proximate may mean operationally proximate—able to work and interact together either directly or through intermediate components—as well as and/or in addition to physically proximate and/or mechanically proximate, such as overlapping and/or integrated with); other exemplary implementations include but are not limited to like data presentation devices operably coupled with virtually any one or more mirrors described herein (e.g., one or more mirrors respectively associated with one or more image capture devices 102, 110, 300, 304, 308, 312, 316, and/or 320 as described in relation to FIG. 3). Yet another exemplary implementation of data presentation device 106 proximate to zero degree view mirror 100 includes but is not limited to data presentation device 106 in physical communication with zero degree view mirror 100; other exemplary implementations include but are not limited to like data presentation devices integral with virtually any one or more mirrors described herein (e.g., mirrors 102, 110, 300, 304, 308, 312, 316, and/or 320 as described in relation to FIG. 3). One exemplary implementation of data presentation device 106 in physical communication with zero degree view mirror 100 includes but is not limited to data presentation device 106 connected with a frame connected with said physical zero degree view mirror 100; other exemplary implementations include but are not limited to like data presentation devices connected with a frame connected with virtually any one or more mirrors described herein (e.g., mirrors 102, 110, 300, 304, 308, 312, 316, and/or 320 as described in relation to FIG. 3). In some implementations, one or more data presentation devices such as those described herein can be light generation devices (e.g., plasma displays and/or liquid crystal displays), image presentation devices (e.g., direct projection to the eye retinal displays), and/or laser devices (e.g., laser diode devices).

Figure 2:
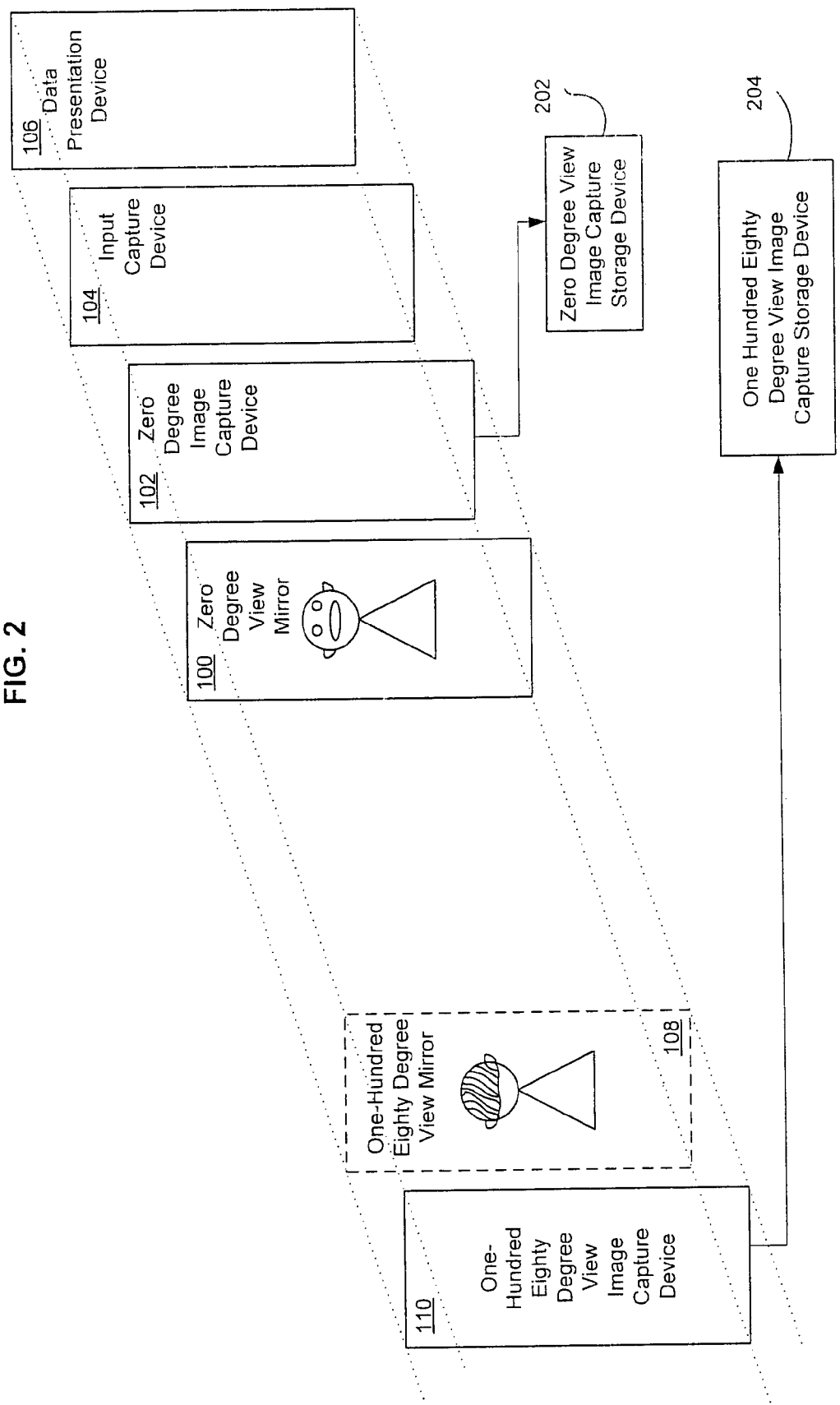
FIG. 2 depicts a partial view of a system that may serve as an illustrative environment of and/or for subject matter technologies.

Referring now to FIG. 2, depicted is a partial view of a system that may serve as an illustrative environment of and/or for subject matter technologies. Illustrated is that zero degree view image capture storage device 202 interfaces with zero degree image capture device 102. Shown is that one-hundred eighty degree view image capture storage device 204 interfaces with one-hundred eighty degree view image capture device 110. Depicted is that, in one exemplary implementation, zero degree view image capture storage device 202 receives images of a person's face and frontal torso from zero degree image capture device 102 while one-hundred eighty degree view image capture storage device 204 receives images of the back of the person's head and rear torso from one-hundred eighty degree view image capture device 110. For example, in one implementation technologies described herein will let a person see how she/he appears from front, back, sides, diagonally, etc. Those having skill in the art will appreciate that the presentation of images, as described herein, have not called out an orientation of presented views for sake of clarity. Accordingly, those skilled in the art will appreciate that the presentations described herein could be indicative of standard mirror views (e.g., reversed left to right) and/or non-standard mirror views (e.g., non-reversed views).

Figure 3:
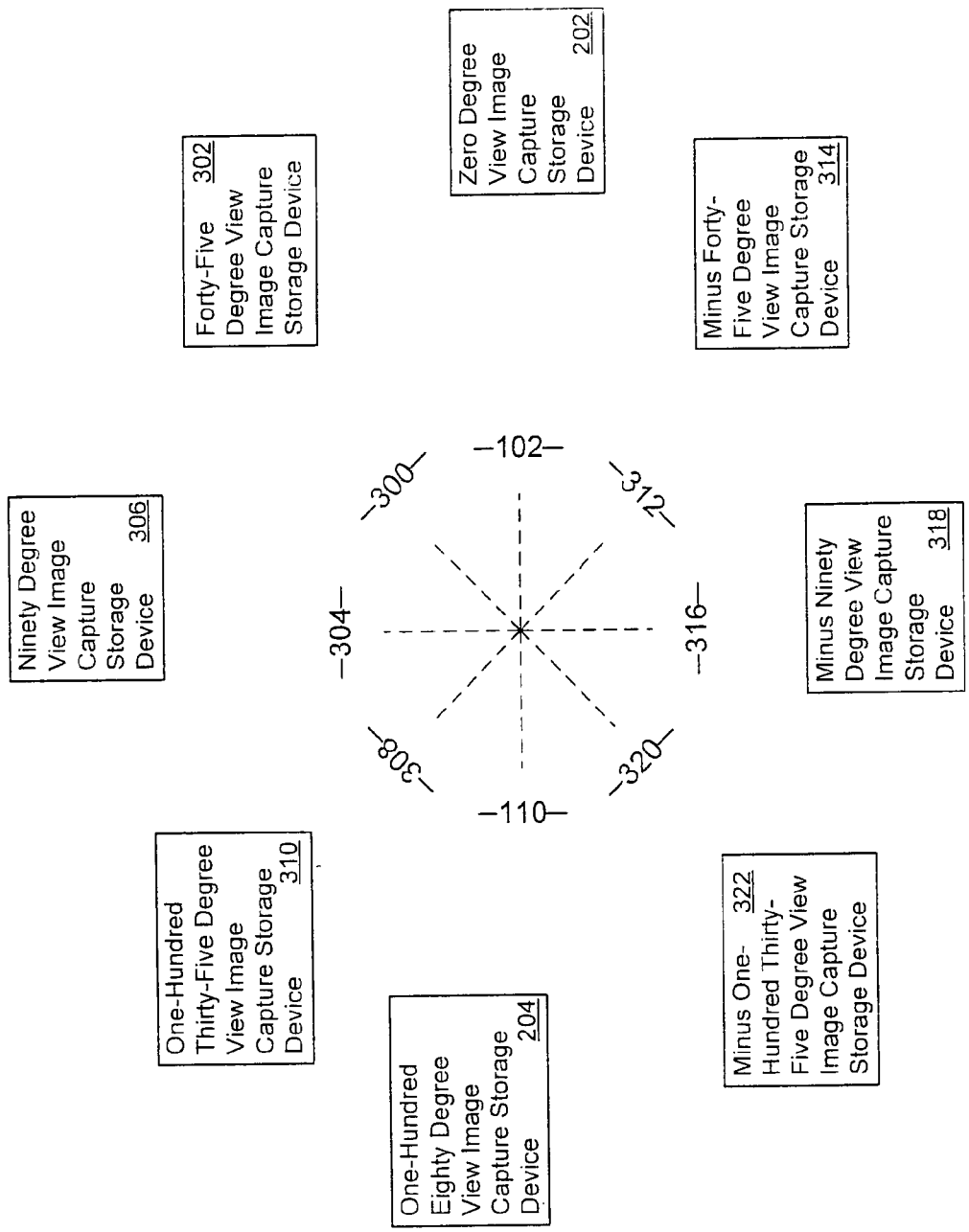
FIG. 3 illustrates a partial view of a system that may serve as an illustrative environment of and/or for subject matter technologies.

With reference now to FIG. 3, illustrated is a partial view of a system that may serve as an illustrative environment of and/or for subject matter technologies. Shown are zero degree image capture device 102, forty-five degree image capture device 300, ninety-degree view image capture device 304, one-hundred-thirty-five degree view image capture device 308, minus-forty-five degree image capture device 312, minus-ninety-degree image capture device 316, and minus-one-hundred-thirty-five degree view image capture device 320 respectively coupled with zero degree view image capture storage device 202, forty-five degree view image capture storage device 302, ninety-degree view image capture storage device 306, one-hundred-thirty-five degree view image capture storage device 310, minus-forty-five degree view image capture storage device 314, minus-ninety-degree view image capture storage device 318, and minus-one-hundred-thirty-five degree view image capture storage device 322. In some implementations, one or more of the herein-described image capture devices have respectively associated mirrors, there such association is analogous to one or more associations described in relation to FIGS. 1 and/or 2 and or elsewhere herein (e.g., a proximate association and/or an operable association and/or a physical association and/or an integral association). In some implementations, some of the mirrors described herein may be hand mirrors. In addition, those skilled in the art will recognize that the angles described herein are indicative of angles within substantially any appropriate coordinate system such as planar, spherical, cylindrical, etc.

Those skilled in the art will appreciate that in some implementations one or more of the image capture devices described herein entail image representation capture devices, where the capturing and/or representing of information can entail capture and/or representation in a way that is qualitatively different from that normally associated with what a human sees when s/he views a physical mirror—e.g. infrared or UV or some like kind of detection. In addition to the foregoing, those skilled in the art will appreciate that the presentations of images such as described herein can likewise entail such qualitatively different representations, or other representational information drawn on such qualitatively different representations. In addition to the foregoing, in some implementations, image representation capture may include an indication of a direction and/or field of view of an image capture device and/or a light reflecting surface/structure associated therewith (e.g., an outline on a presented image of what a capturing mirror "sees").

Figure 4:
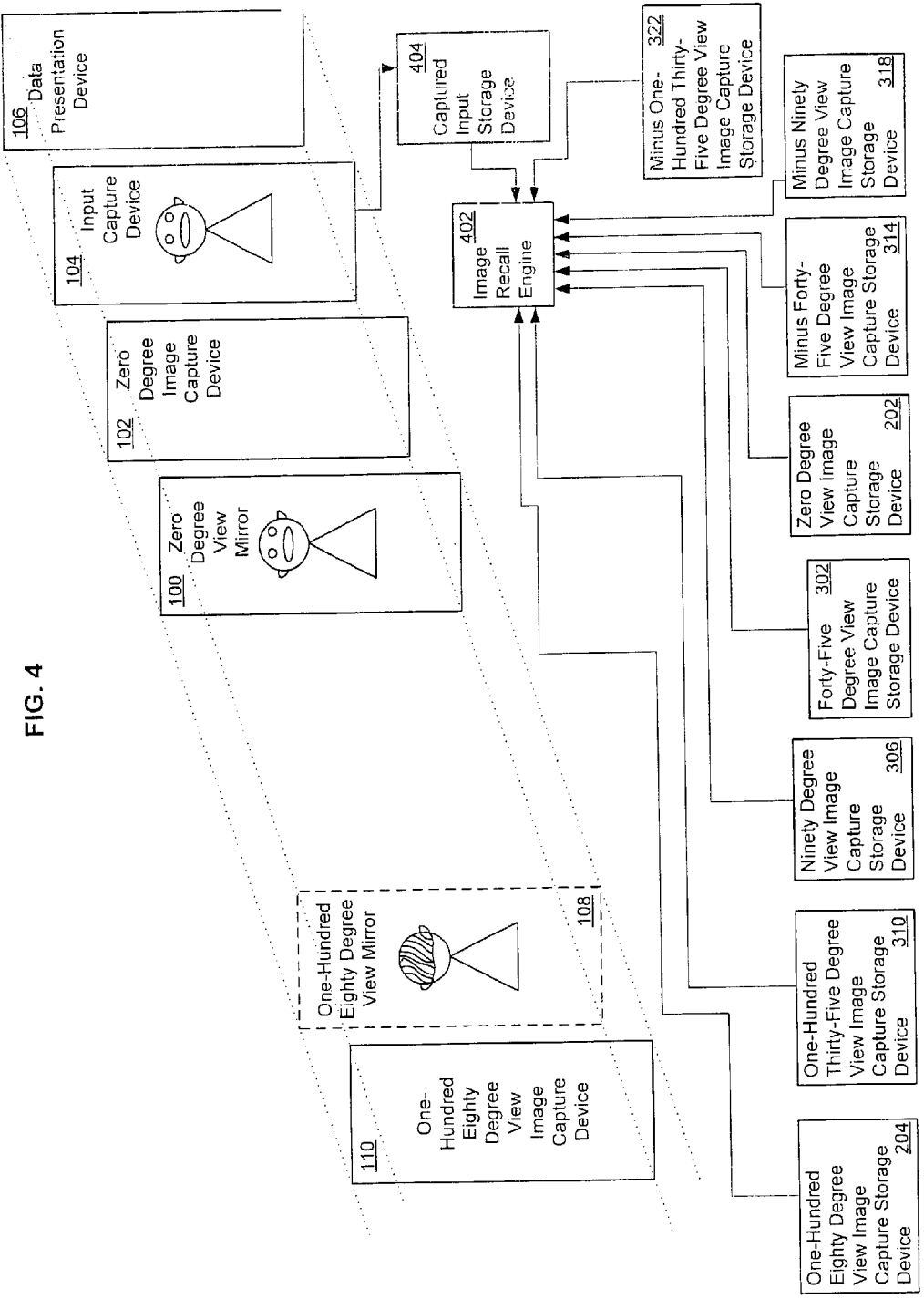
FIG. 4 illustrates a partial view of a system that may serve as an illustrative environment of and/or for subject matter technologies.

Referring now to FIG. 4, illustrated is a partial view of a system that may serve as an illustrative environment of and/or for subject matter technologies. Shown is image recall engine 402 receiving signals (e.g., such as those sent by modified image transmission device 308 shown/described in FIG. 3). Image recall engine 402 is shown interfaced with zero degree view image capture storage device 202, forty-five degree view image capture storage device 302, ninety-degree view image capture storage device 306, one-hundred-thirty-five degree view image capture storage device 310, minus-forty-five degree view image capture storage device 314, minus-ninety-degree view image capture storage device 318, and minus-one-hundred-thirty-five degree view image capture storage device 322. Image recall engine 409 is depicted interfaced with captured input storage device 404.

In one exemplary implementation, captured input storage device 404 receives one or more images along with any associated user input(s) from input capture device 104 (e.g., images with an indication that the user desires that different angled views (e.g., front/back/side views of his body/face/hairline/etc.) be presented). Thereafter, captured input storage device 404 transmits the received one or more images and any associated user input indicative of desired views to image recall engine 402. In one implementation, image recall engine 402 causes a display of the one or more multi-angle view, images in response to the user input requested multiple views through data presentation device 106.

Figure 5:
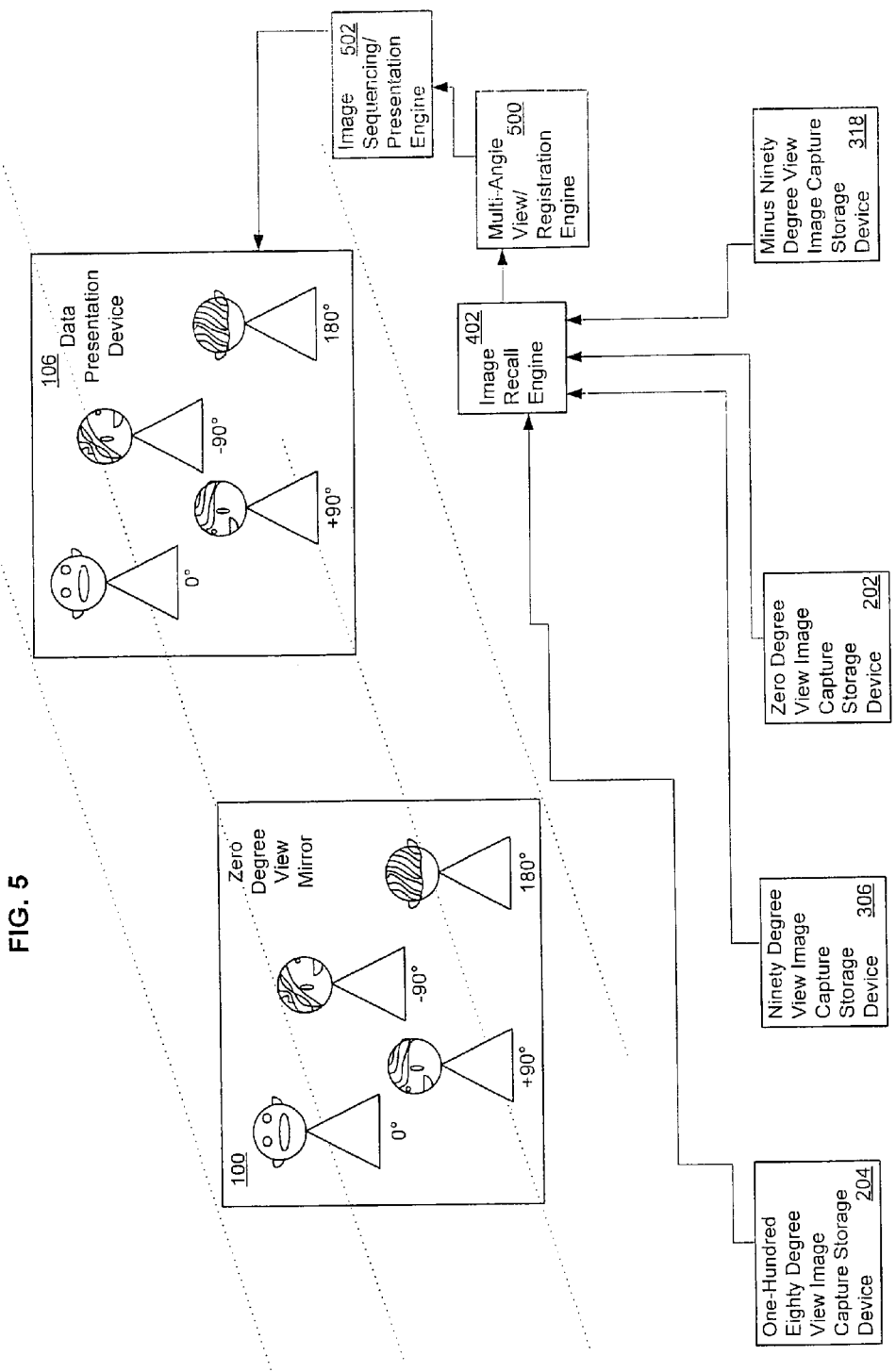
FIG. 5 shows a partial view of a system that may serve as an illustrative environment of and/or for subject matter technologies.

With reference now to FIG. 5, shown is a partial, view of a system that may serve as an illustrative environment of and/or for subject matter technologies. Depicted is multi-angle view/registration engine 500 interfaced with image sequencing/presentation engine 502. In one exemplary implementation, image recall engine 402—typically in response to user input specifying one or more desired multi-angle views—retrieves one or more images from one or more of zero degree view image capture storage device 202, forty-five degree view image capture storage device 302, ninety-degree view image capture storage device 306, one-hundred-thirty-five degree view image capture storage device 310, minus-forty-five degree view image capture storage device 314, minus-ninety-degree view image capture storage device 318, and minus-one-hundred-thirty-five degree view image capture storage device 322. Subsequently, multi-angle view/registration engine 500 constructs one or more partial frames having views as specified by the user input. Thereafter, in one implementation image sequencing/presentation engine 502 then presents the various multi-angle views in such a fashion that the views specified by the user input can be viewed. For instance, image sequencing/presentation engine 502 might present a freeze-frame presentation of various captured views. For example, views such as those captured by the image captured devices described in relation to FIG. 3, where the zero degree view is understood to be that associated with the person looking directly into the mirror. Specifically, shown in FIG. 5 are exemplary representations of data presentation device 106 presenting views of a person through zero degree view mirror 100; the views shown are illustrated as having been captured from zero degree view image capture storage device 202, forty-five degree views image capture storage device 302, one-hundred-thirty-five degree view image capture storage device 310, and minus-forty-five degree view, image capture storage device 314, where the person is illustrated as having had her views captured while looking face-on into zero angle view mirror 100.

While the foregoing has described presentations of various multi-angle views of more-or-less static images those skilled in the art will appreciate that the teachings herein may be combined with the teachings of the above referenced technologies and incorporated by reference time-lapsing mirror technologies such that the various multi-angle views presented may be time lapsed images. The combination of the present teachings and the teachings of the time-lapsing mirror technologies are within the ambit of one having skill in the art in light of the teachings herein (e.g., the as-filed claims), and hence are not expressly recited here for sake of clarity.

While the foregoing has described presentations of various multi-angle views of more-or-less static images as well as presentations of more-or-less time-lapsed images, those skilled in the art will appreciate that the teachings herein may be combined with the teachings of the above-referenced technologies and incorporated by reference cosmetic-enhancement mirror technologies such that the various multi-angle views presented may be either static and/or time lapsed images of cosmetically enhanced subjects. The combination of the present teachings and the teachings of the cosmetic enhancement mirror technologies are within the ambit of one having skill in the art in light of the teachings herein (e.g., the as-filed claims), and hence are not expressly recited here for sake of clarity.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning Edith a presentation of a flowchart(s) presenting, an overall view and thereafter providing additions to and/or further details in subsequent flowcharts) generally allows for a rapid and easy understanding of the various process implementations.

Figure 6:
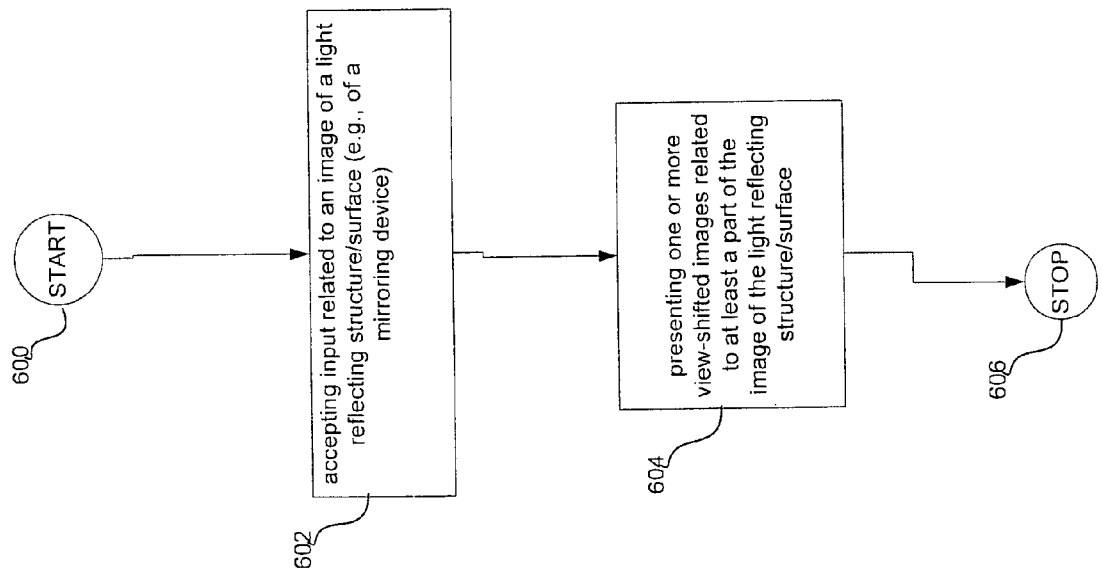
FIG. 6 illustrates a high-level logic flowchart of a process.
Figure 7:
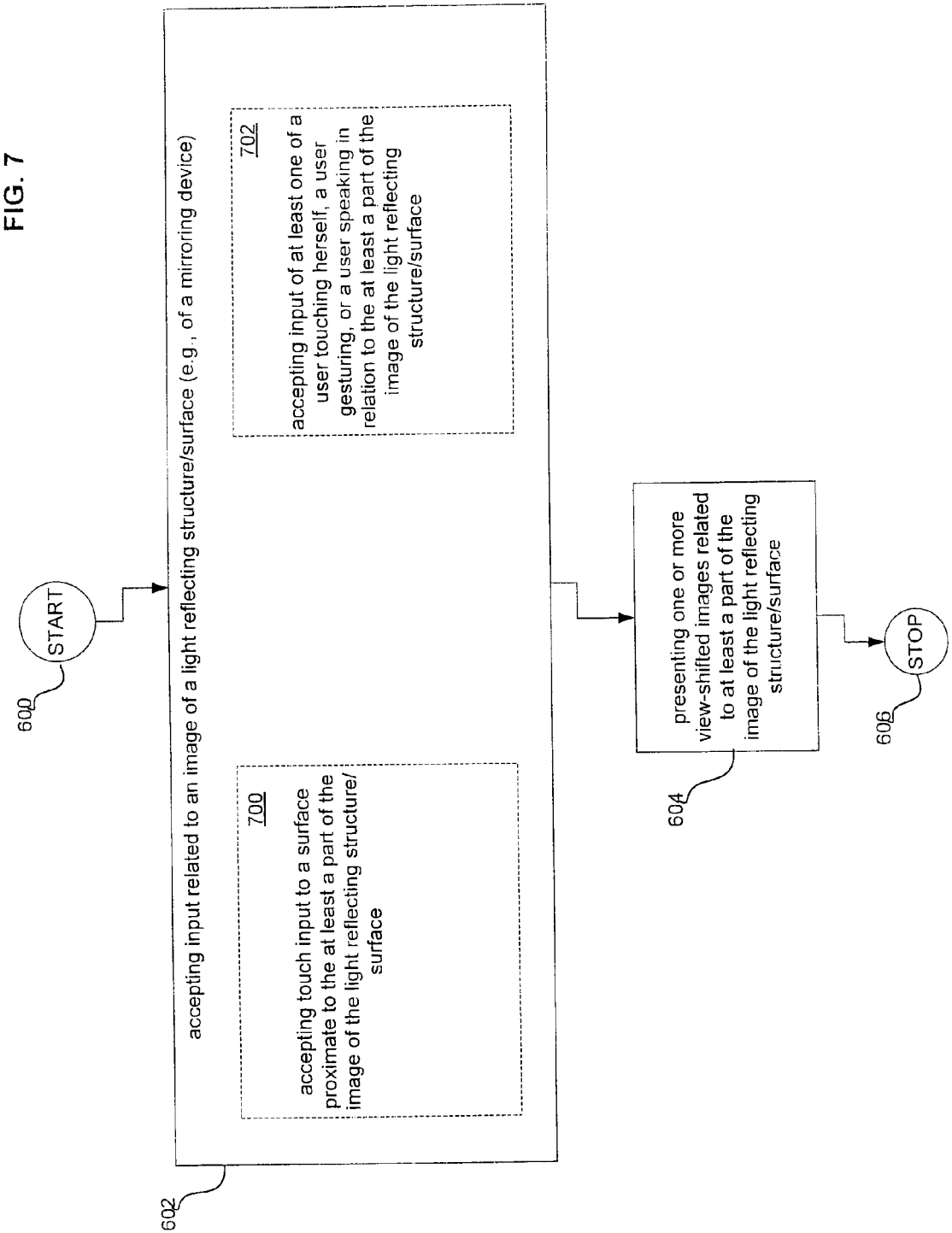
FIG. 7 shows a high-level logic flowchart depicting alternate implementations of the high-level logic flowchart of FIG. 6.

Referring now to FIG. 6, illustrated is a high-level logic flowchart of a process. Method step 600 shows the start of the process. Method step 602 shows accepting input related to an image of a light reflecting structure/surface (e.g., of a mirroring device) (e.g., via input capture device 104 and/or a supporting component(s) accepting input when a user has indicated one or more portions of an image in zero degree view mirror 100). Method step 604 depicts presenting one or more view-shifted images related to at least a part of the image of the light reflecting structure/surface (e.g., such as shown/described in relation to FIG. 5 and/or elsewhere herein). Method step 606 shows the end of the process. Those skilled in the art will appreciate that, in some implementations, the "at least a part of the image" can include but is not limited to a recognized region of an image or a recognized anchor point associated with an image which will provide the ability to do presentation on regions that both are and are not readily visually coordinated with an original field of view of a mirror. For example, in a hand-held mirror implementation, a user might zoom in on a region of an image and then ask to see a time-lapse sequence of images representative of changes in that zoomed-in region, such that the zoomed-in region is not readily visually coordinated with the original unzoomed field of view of the mirror. The inventors point out that those skilled in the art will appreciate that while the zoomed-in region might not be easily visually coordinated with the un-zoomed field of view, in some implementations the use of anchor points will allow coordination between the zoomed and unzoomed views. In addition, the inventors further point out that while examples set forth herein focus on anatomy and/or anatomical change for sake of clarity, the systems described herein can actually track and/or show a time lapse of substantially any object that may be reflected in the mirror With reference now to FIG. 7, shown is a high-level logic flowchart depicting alternate implementations of the high-level logic flowchart of FIG. 6. Depicted is that in various alternate implementations, method step 602 includes method step 700 and/or method step 702. Method step 700 shows accepting touch input to a surface proximate to the at least a part of the image of the light reflecting structure/surface (e.g., via input capture device 104 and/or captured input storage device 404 capturing input when a user has indicated a desire to see one or more alternate angle views instead of and/or in addition to an image in zero degree view mirror 100) Method step 702 depicts accepting input of at least one of a user touching herself, a user gesturing, or a user speaking in relation to the at least a part of the image of the light reflecting structure/surface (e.g., via input capture device 104 capturing input when a user's gestures or pointing relative to at least a part of an image in zero degree view mirror 100 and/or the user speaking a command in relation to at least a part of an image in zero degree view mirror 100 that the user wishes to see one of a multi-angle view of the image in zero degree view mirror 100). As an aside, the inventors point out that there are various different implementations of the light reflecting surface/structure as described herein, such as bathroom, hall, foyer, refrigerator, living room, etc. mounted/located mirrors.

Figure 8:
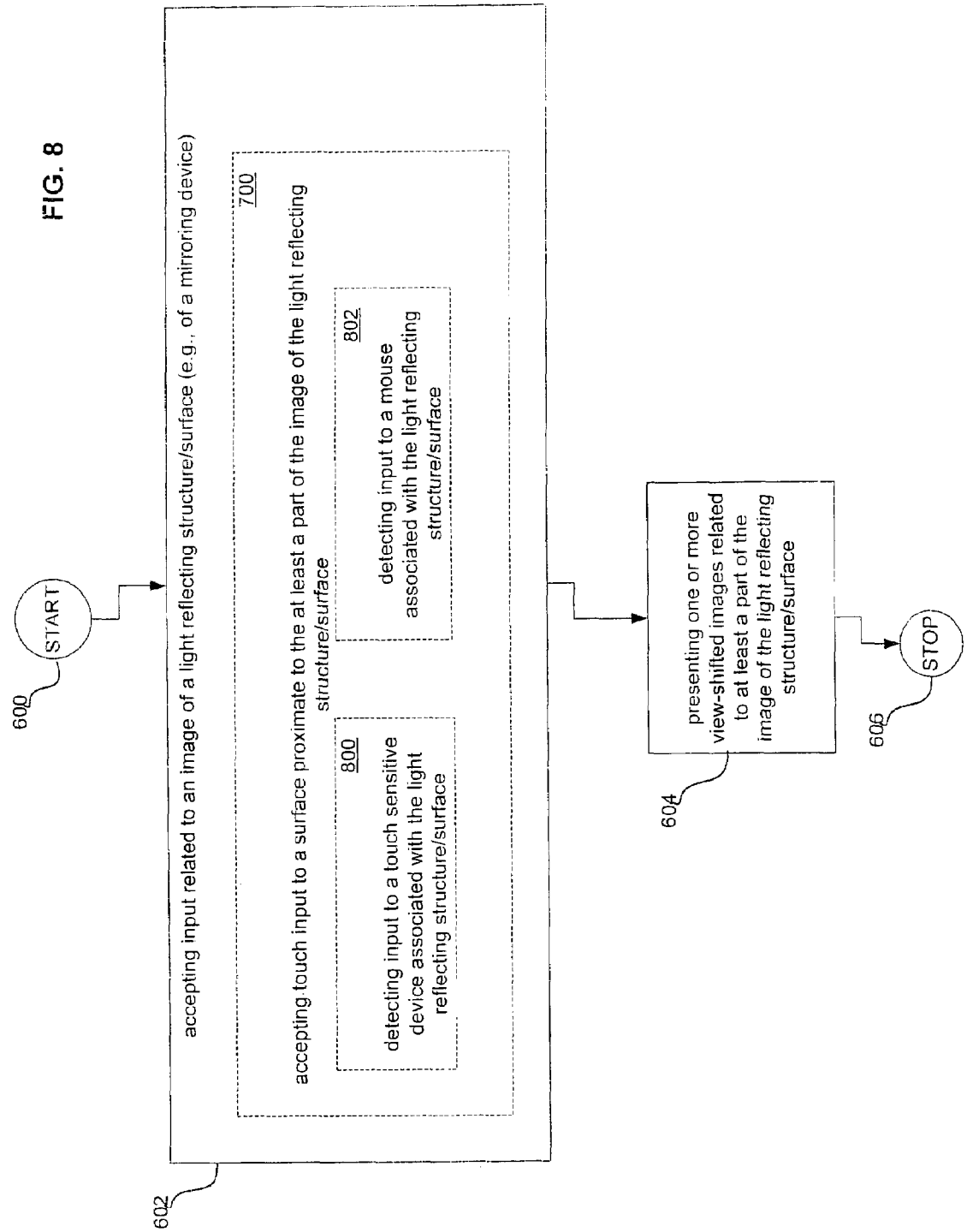
FIG. 8 depicts a high-level logic flowchart depicting alternate implementations of the high-level logic flowchart of FIG. 7.

Referring now to FIG. 8, depicted is a high-level logic flowchart depicting alternate implementations of the high-level logic flowchart of FIG. 7. Depicted is that in one alternate implementation, method step 700 includes method step 800 and/or method step 802. Method step 800 shows detecting input to a touch sensitive device associated with the light reflecting structure/surface (e.g. via zero degree view mirror 100 and/or input capture device 104 and/or one or more of their supporting components). Method step 802 depicts detecting input to a mouse associated with the light reflecting structure/surface (e.g. via zero degree view mirror 100 and/or input capture device 104 and/or one or more of their supporting components).

Figure 9:
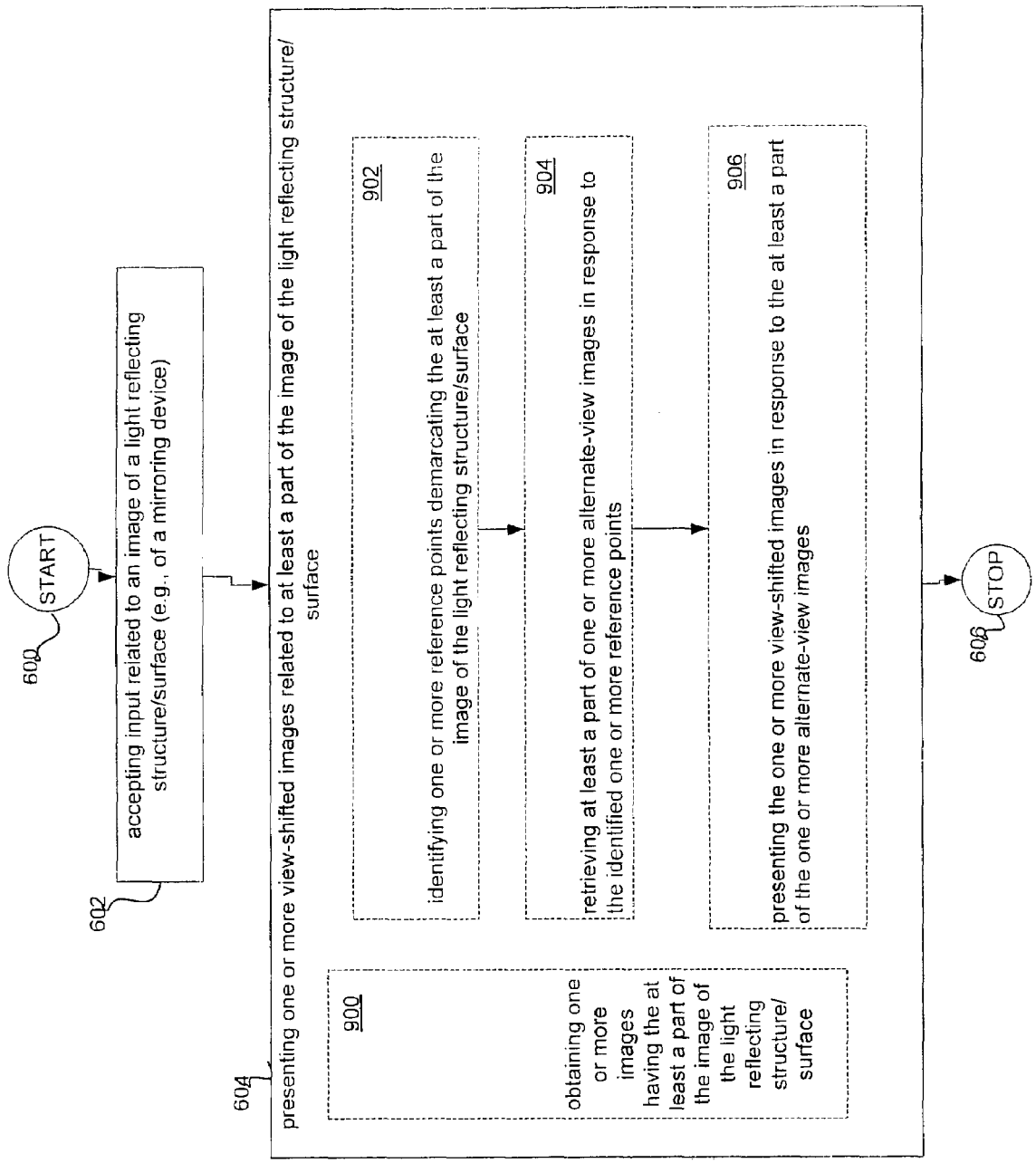
FIG. 9 illustrates a high-level logic flowchart depicting alternate implementations of the high-level logic flowchart of FIG. 6.

With reference now to FIG. 9, illustrated is a high-level logic flowchart depicting alternate implementations of the high-level logic flowchart of FIG. 6. Depicted is that in various alternate implementations, method step 604 includes method step 900, and/or method steps 902-906. Method step 900 shows one alternate implementation of obtaining one or more images having the at least a part of the image of the light reflecting structure/surface. For example, obtaining the one or more images via image recall engine 409, and/or one or more of image capture storage devices 202, 204, 302, 306, 310, 314, 318, and/or 392. Those having skill in the art will recognize that the use of image capture devices in conjunction with image capture storage devices herein is for sake of clarity, and that while in some implementations capture and storage reside in the different devices, in other implementations the capture and storage reside in the same device (e.g., a photo-detector (CCD; CMOS) array itself may constitute both a capture and a (transient) store).

Continuing to refer to FIG. 9, method steps 902-906 depict another alternate embodiment. Method step 902 illustrates identifying one or more reference points demarcating the at least a part of the image of the light reflecting structure/surface (e.g., via multi-angle view/registration engine 500). Method step 904 shows retrieving at least a part of one or more alternate-view images in response to the identified one or more reference points; (904+text) (e.g., via image recall engine 402 and/or one or more of the image capture storage devices 202, 204, 302, 306, 310, 314, 318, and/or 322). Method step 906 depicts presenting the one or more view-shifted images in response to the at least a part of the one or more alternate-view images (e.g., via data presentation device 106 and/or image recall engine 402 and/or multi-angle view/registration engine 500 and/or image sequencing/presentation engine 502).

Figure 10:
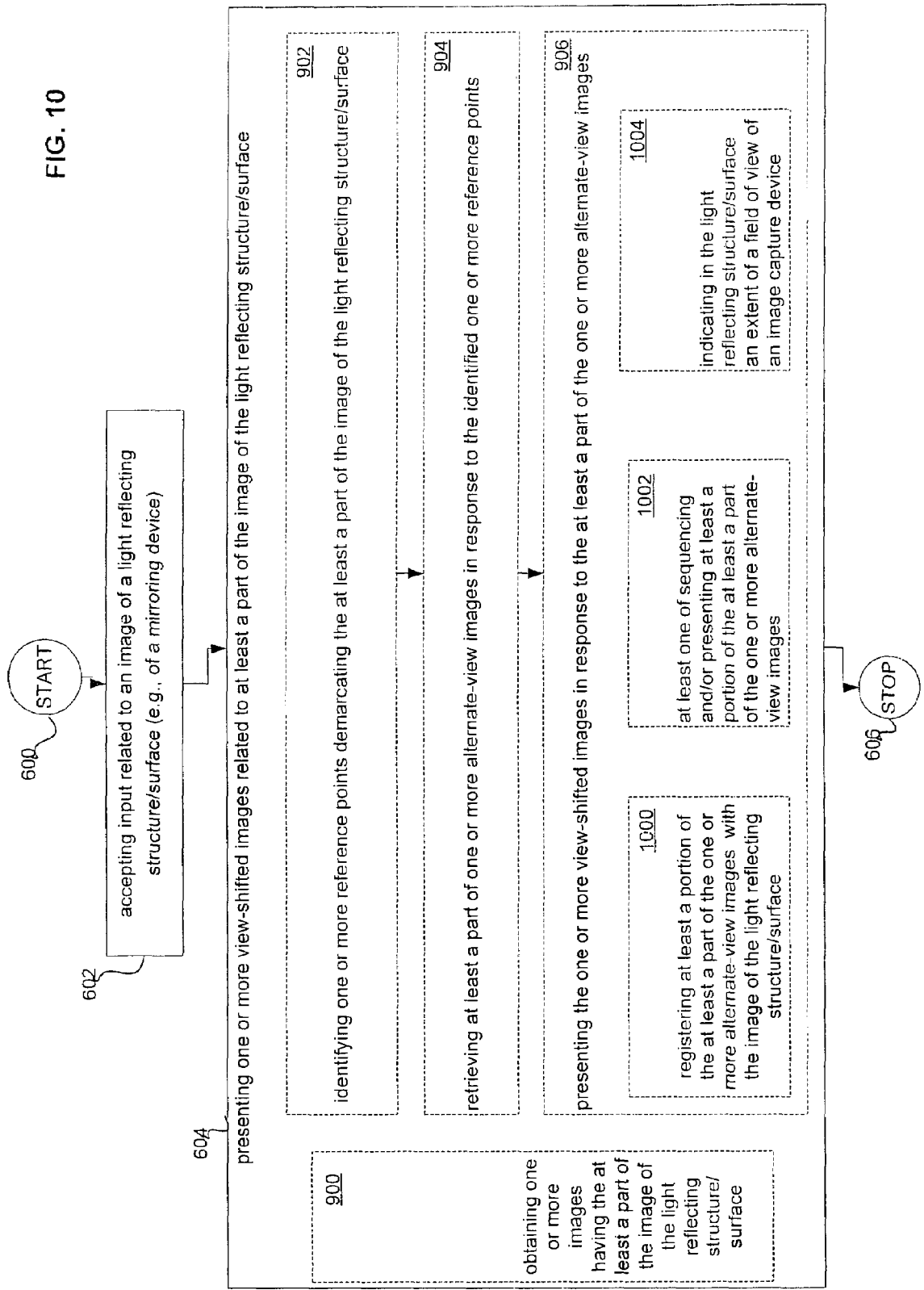
FIG. 10 shows a high-level logic flowchart depicting alternate implementations of the high-level logic flowchart of FIG. 9.

Referring now to FIG. 10, shown is a high-level logic flowchart depicting alternate implementations of the high-level logic flowchart of FIG. 9. Depicted is that in various alternate implementations, method step 906 includes method step 1000 and/or method step 1002. Method step 1000 illustrates registering at least a portion of the at least a part of the one or more alternate-view images with the image of the light reflecting structure/surface (e.g., via multi-angle view/registration engine 500 performing standard registrations or modified registrations such that the ultimately presented image(s) appear as distortions of mirror views, where such registrations may be accomplished using signal processing techniques to create a "panorama" and/or "fish-eye" and/or "funhouse" view, with distortions). Method step 1002 shows at least one of sequencing or presenting at least a portion of the one or more view-shifted images in response to the at least a part of the one or more alternate-view images (e.g., via image sequencing/presentation engine 502). In some implementations method step 1002 includes at least one of sequencing at least two view-shifted images captured substantially contemporaneously or sequencing at least two view-shifted images captured at substantially different instances in time. One specific instance of the foregoing includes showing a rotating view of a person in real time and/or showing a rotating view of a person across time to make it look to the viewer as if s/he is on a rotating pedestal. Another specific instance of the foregoing includes slow-rotation through time which is also an example such as where a viewer stands still and watches as s/he spins forward and backward through time. Method step 1004 depicts indicating in the light reflecting structure/surface an extent of a field of view of an image capture device (e.g., an indication representative of a field of view (e.g., relative and/or absolute) associated with the one or more devices used to generate (e.g., reflect and/or capture) the one or more view-shifted-images).

Figure 11:
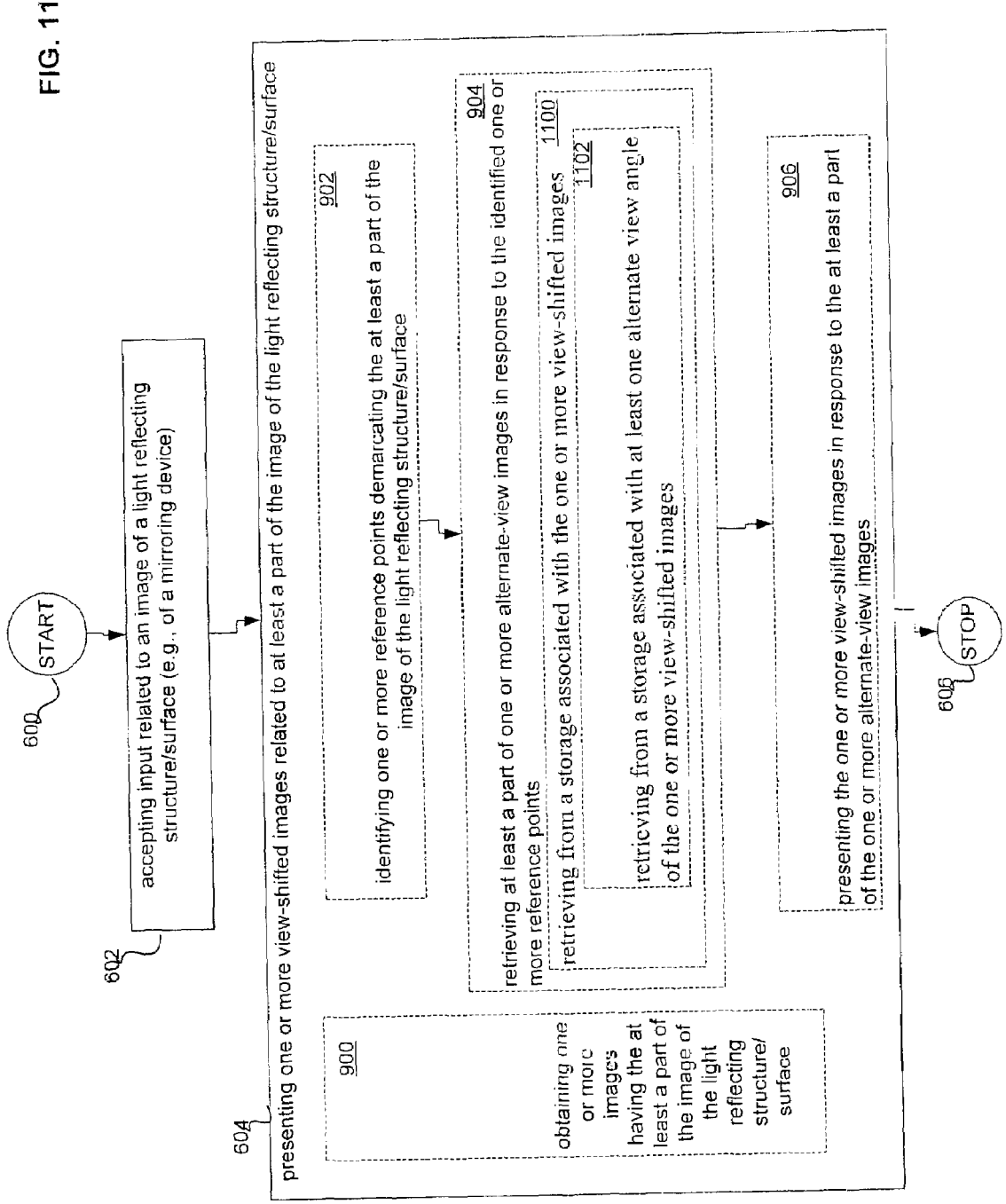
FIG. 11 depicts a high-level logic flowchart depicting several alternate implementations of the high-level logic flowchart of FIG. 10.

Referring now to FIG. 11, depicted is a high-level logic flowchart depicting several alternate implementations of the high-level logic flowchart of FIG. 10. Shown is that in one alternate implementation, method step 904 includes method step 1100. Method step 1100 shows retrieving from a storage associated with the one or more view-shifted images (e.g., via retrieving from at least one multi-angle view image capture storage device and/or its supporting components). Further shown is that in one alternate embodiment method step 1100 can include method step 1102 which depicts retrieving from a storage associated with at least one alternate view angle of the one or more view-shifted images.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein mats be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

All of the above U.S. patents, U.S. patent application publications, U.S. patent applications, foreign patents, foreign patent applications, and non-patent publications referred to in this specification and/or listed in any Application Data Sheet are incorporated herein by reference, in their entireties.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together, etc.).

The invention claimed is:

1. A system comprising:
    at least one digital mirror;
    a data presentation device proximate to said at least one digital mirror;
    a multi-angle view/registration engine operably couplable to said data presentation device; and
    at least one image capture device operably couplable with said multi-angle view/registration engine, wherein said at least one image capture device includes:
    [I] at least one image representation capture device and at least one indication that said at least one image representation capture device is to be located to capture a field of view at least partially different from a field of view of said at least one digital mirror;
    [II] at least one image representation capture device located to capture a field of view at least partially different from a field of view of said at least one digital mirror;
    [III] at least one image representation capture device and at least one indication that said at least one image representation capture device is to be located to capture a field of view of said at least one digital mirror; or
    [IV] at least one image representation capture device located to capture a field of view of said at least one digital mirror.

2. The system of claim 1, wherein said at least one digital mirror further comprises:
    at least one of a Liquid Crystal display device, a plasma display device, or a laser-diode display device.

3. The system of claim 1, wherein said at least one digital mirror further comprises:
    a microelectrical mechanical system display device.

4. The system of claim 1, wherein said data presentation device further comprises: an image representation presentation device.

5. The system of claim 1, further comprising: at least one image storage device operably couplable with said data presentation device.

6. The system of claim 1, further comprising: at least one image recall engine operably couplable with said data presentation device.

7. The system of claim 1, comprising:
said [I] at least one image representation capture device and at least one indication that said at least one image representation capture device is to be located to capture a field of view at least partially different from a field of view of said at least one digital mirror including:
 [A] at least one image representation capture device and at least one indication that said at least one image representation capture device is to be located to capture a field of view at least partially opposing a field of view of said at least one digital mirror; or
said [II] at least one image representation capture device located to capture a field of view at least partially different from a field of view of said at least one digital mirror including:
 [A] at least one image representation capture device located to capture a field of view at least partially opposing a field of view of said at least one digital mirror.

8. The system of claim 1, comprising:
said [I][A] at least one image representation capture device and at least one indication that said at least one image representation capture device is to be located to capture a field of view at least partially different from a field of view of said at least one digital mirror including:
 (1) at least one image representation capture device and at least one indication that said at least one image representation capture device is to be located to capture a field of view rotated substantially 180° degrees relative to the field of view of said at least one digital mirror; or
said [II][A] at least one image representation capture device located to capture a field of view at least partially opposing a field of view of said at least one digital mirror including:
 (1) at least one image representation capture device located to capture a field of view having an offset relative to the field of view of said at least one digital mirror.

9. The system of claim 8, comprising:
said [I][A] at least one image representation capture device and at least one indication that said at least one image representation capture device is to be located to capture a field of view at least partially opposing a field of view of said at least one digital mirror including:
 (1) at least one image representation capture device and at least one indication that said at least one image representation capture device is to be located to capture a field of view having an offset relative to the field of view of said at least one digital mirror; or
[II][A] said at least one image representation capture device located to capture a field of view at least partially opposing a field of view of said at least one digital mirror including:
 (1) at least one image representation capture device located to capture a field of view having an offset relative to the field of view of said at least one digital mirror.

10. The system of claim 9, comprising:
said [I][A](1) at least one image representation capture device and at least one indication that said at least one image representation capture device is to be located to capture a field of view having partially opposing a field of view of said at least one digital mirror including:
 (a) at least one image representation capture device and at least one indication that said at least one image representation capture device is to be located to capture a field of view having an offset relative to the field of view of said at least one digital mirror; or
said [II][A](1) at least one image representation capture device located to capture a field of view of said at least one digital mirror including:
 (1) at least one image representation capture device located to capture a field of view having an offset relative to the field of view of said at least one digital mirror.

11. The system of claim 1, wherein said at least one image capture device further comprises:
at least one image representation capture device alignable relative to a field of view of said at least one digital mirror.

12. The system of claim 1, wherein said at least one image capture device further comprises:
at least two image representation capture devices alignable relative to a field of view of said at least one digital mirror.

13. The system of claim 1, further comprising: at least one input capture device operably couplable with said data presentation device.

14. The system of claim 1, further comprising: at least one image sequencing/presentation engine operably couplable with said data presentation device.

15. The system of claim 1, wherein said multi-angle view/registration engine operably couplable to said data presentation device comprises:
a multi-angle view/registration engine component configured responsive to multi-angle view data.

16. The system of claim 15, wherein said multi-angle view/registration engine component configured responsive to multi-angle view data comprises:
a multi-angle view/registration engine component configured responsive to an image other than a zero degree view image.

17. The system of claim 16, wherein said multi-angle view/registration engine component configured responsive to an image other than a zero degree view image comprises:
a multi-angle view/registration engine component configured responsive to an image captured with a device having a field of view different from that of a zero degree image representation capture device of the at least one digital mirror.

18. The system of claim 16, wherein said multi-angle view/registration engine component configured responsive to an image other than a zero degree view image comprises:
a multi-angle view/registration engine component configured responsive to at least one of a forty-five degree view image, a ninety-degree view image, a one-hundred-thirty-five degree view image, a minus-forty-five degree view image, a minus-ninety-degree view image, or a minus-one-hundred-thirty-five degree view image.

19. The system of claim 18, wherein said multi-angle view/registration engine component configured responsive to at least one of a forty-five degree view image, a ninety-degree view image, a one-hundred-thirty-five degree view image, a minus-forty-five degree view image, a minus-ninety-degree view image, or a minus-one-hundred-thirty-five degree view image comprises:
a multi-angle view/registration engine component configured responsive to at least one of (i) an image associated with an image capture device oriented substantially forty-five degrees relative to a substantially zero degree axis associated with the at least one digital mirror, (ii) an image associated with an image capture device oriented substantially ninety degrees relative to a substantially zero degree axis associated with the at least one digital mirror, (iii) an image associated with an image capture device oriented substantially one-hundred-thirty-five degrees relative to a substantially zero degree axis associated with the at least one digital mirror, (iv) an image associated with an image capture device oriented substantially minus-forty-five degrees relative to a substantially zero degree axis associated with the at least one digital mirror, (v) an image associated with an image capture device oriented substantially minus-ninety degrees relative to a substantially zero degree axis associated with the at least one digital mirror, or (vi) an image associated with an image capture device oriented substantially minus-one-hundred-thirty-five degrees relative to a substantially zero degree axis associated with the at least one digital mirror.

20. The system of claim 1, wherein said multi-angle view/registration engine operably couplable to said data presentation device comprises:
   a data presentation device component (i) configured to responsive to at least one of weight data or height data and (ii) operably couplable with a multi-angle view/registration engine component configured responsive to an image other than a zero degree view image.

21. The system of claim 1, wherein said multi-angle view/registration engine operably couplable to said data presentation device comprises:
   a data presentation device component (i) configured responsive to at least time lapse information and (ii) operably couplable with a multi-angle view/registration engine component configured responsive to an image other than a zero degree view image.

22. The system of claim 1, wherein said multi-angle view/registration engine operably couplable to said data presentation device comprises:
   a data presentation device component (i) configured to present data in a visual form including but not limited to at least one of a graphical form, a tabular form, a textual form, a picture form, or a drawing form and (ii) operably couplable with a multi-angle view/registration engine component configured responsive to an image other than a zero degree view image.

23. The system of claim 1, wherein said multi-angle view/registration engine operably couplable to said data presentation device comprises:
   a multi-angle view/registration engine component configured to present data in an audible form including but not limited to at least one of a music form, a speech form, or a sound form.

24. The system of claim 1, wherein said multi-angle view/registration engine operably couplable to said data presentation device comprises:
   a multi-angle view/registration engine component configured to present data in store-and-forward formats including but not limited to at least one of an email format, a voicemail format, a simple message system format, a digest format, or a database format.

25. A system comprising:
   a digital mirror;
   a data presentation device proximate to said digital mirror; and
   multi-angle view engine operably couplable to said data presentation device; wherein said multi-angle/registration engine operably couplable to said data presentation device includes:
      a multi-angle view/registration engine component configured responsive to multi-angle view data, wherein said multi-angle view/registration engine component configured responsive to multi-angle view data includes:
         a multi-angle view/registration engine component configured responsive to an image other than a zero degree view image, wherein said multi-angle view/registration engine component configured responsive to an image other than a zero degree view image includes:
            a multi-angle view/registration engine component configured responsive to an image captured with a device having a field of view different from that of a zero degree image representation capture device of the at least one digital mirror.

* * * * *

UNITED STATES PATENT AND TRADEMARK OFFICE
CERTIFICATE OF CORRECTION

| | |
|---|---|
| PATENT NO. | : 7,705,800 B2 |
| APPLICATION NO. | : 11/982396 |
| DATED | : April 27, 2010 |
| INVENTOR(S) | : Edward K. Y. Jung et al. |

It is certified that error appears in the above-identified patent and that said Letters Patent is hereby corrected as shown below:

IN THE SPECIFICATIONS:

Column 1, lines 12-13, "listed application(s);" should read --listed application(s)--

Column 1, line 14, "herewith the" should read --herewith; the--

IN THE CLAIMS:

Column 13, line 20, Claim 8, "claim 1" should read --claim 7--

Column 13, lines 24-25, Claim 8, "different from a field of view of said" should read --opposing a field of view of said--

Column 13, lines 37-38, Claim 8, "having an offset relative to the field of view of said" should read --rotated substantially 180 degrees relative to the field of view of said--

Column 13, line 40, Claim 9, "claim 8" should read --claim 7--

Column 13, lines 63-64, Claim 10, "partially opposing a field of view" should read --an offset relative to the field of view--

Column 14, lines 1-2, Claim 10, "having an offset relative to the field of view" should read --rotated between zero and plus or minus substantially 180 degrees relative to the field of view--

Column 14, line 4, Claim 10, "capture a field of view of said" should read --capture a field of view having an offset relative to the field of view of said--

Column 14, line 6, Claim 10, "(1) at least one" should read --(a) at least one--

Column 14, lines 7-8, Claim 10, "capture a field of view having an offset relative to the field of view" should read --capture a field of view rotated between zero and plus or minus substantially 180 degrees relative to the field of view--

Column 15, lines 20-21, Claim 20, "(i) configured to responsive to" should read --(i) configured responsive to--

Signed and Sealed this
Ninth Day of April, 2013

Teresa Stanek Rea
*Acting Director of the United States Patent and Trademark Office*

Column 16, line 21, Claim 25, "multi-angle view engine" should read --multi-angle view/registration engine--

Column 16, lines 22-23, Claim 25, "said multi-angle/registration engine" should read --said multi-angle view/registration engine--